C. G. SMITH.
MACHINE FOR SPIKING RAILS TO TIES.
APPLICATION FILED JAN. 13, 1910.

976,513.

Patented Nov. 22, 1910.

Witnesses
Chas H Smith
A. L. Serrell

Inventor
Carl G. Smith
by Harold Serrell
his atty.

C. G. SMITH.
MACHINE FOR SPIKING RAILS TO TIES.
APPLICATION FILED JAN. 13, 1910.

976,513. Patented Nov. 22, 1910.

Witnesses
Chas. H. Smith
A. H. Perrell

Inventor
Carl G. Smith
by Harold Perrell
his atty.

C. G. SMITH.
MACHINE FOR SPIKING RAILS TO TIES.
APPLICATION FILED JAN. 13, 1910.

976,513.

Patented Nov. 22, 1910.
7 SHEETS—SHEET 7.

Witnesses
Chas H. Smith
H. Serrell

Inventor
Carl G. Smith
by Harold Serrell
his atty

THE NORRIS PETERS CO., WASHINGTON, D. C.

UNITED STATES PATENT OFFICE.

CARL GUSTAF SMITH, OF STOCKHOLM, SWEDEN.

MACHINE FOR SPIKING RAILS TO TIES.

976,513.  Specification of Letters Patent.  Patented Nov. 22, 1910.

Application filed January 13, 1910. Serial No. 537,867.

*To all whom it may concern:*

Be it known that I, CARL GUSTAF SMITH, a subject of the King of Sweden, and resident of Karlbergsvägen 40, Stockholm, in the Kingdom of Sweden, have invented certain new and useful Improvements in Machines for Spiking Rails to Ties, of which the following is a specification, reference being had therein to the accompanying drawings.

This invention relates to a simple machine for forcing the spikes into subjacent ties for fixing the rails to the same. Efforts have been made to provide hammerlike devices for the said purpose but, as far as I know, only in combination with a machinery, more or less extensive, or the so called track-layer, for laying the ties and the rails, when new railways are to be constructed. The machine constructed in accordance with this invention, on the other hand, may be used with the same advantage for constructing new railways, in which case it will coöperate with means at hand for facilitating the laying of the ties and the rails, as well as for repairing railways already in use, in which case it is used as an independent machine. The machine is mounted on a simple, low truck (trolley), which can be moved on the rails on the track-layer or on the track, supported by its running wheels. The machine, which is provided with magazines for the spikes, for which, when emptied, other magazines, filled with spikes, can easily be substituted, is so arranged that all the four spikes can be forced into the ties simultaneously, one at each side of the two rails respectively.

Fig. 4 shows the mechanism for feeding the spikes.
Fig. 4ᵃ is a cross section of a channel guiding the spikes.
Fig. 5 shows some parts of the said feeding mechanism in another position.
Fig. 6 is a plan view and Fig. 7 is a side view of a pair of tongs, adapted to hold the spike during the first blows of the hammer-device.
Fig. 14 is a section on the line C to D of Fig. 13.

Figure 3:
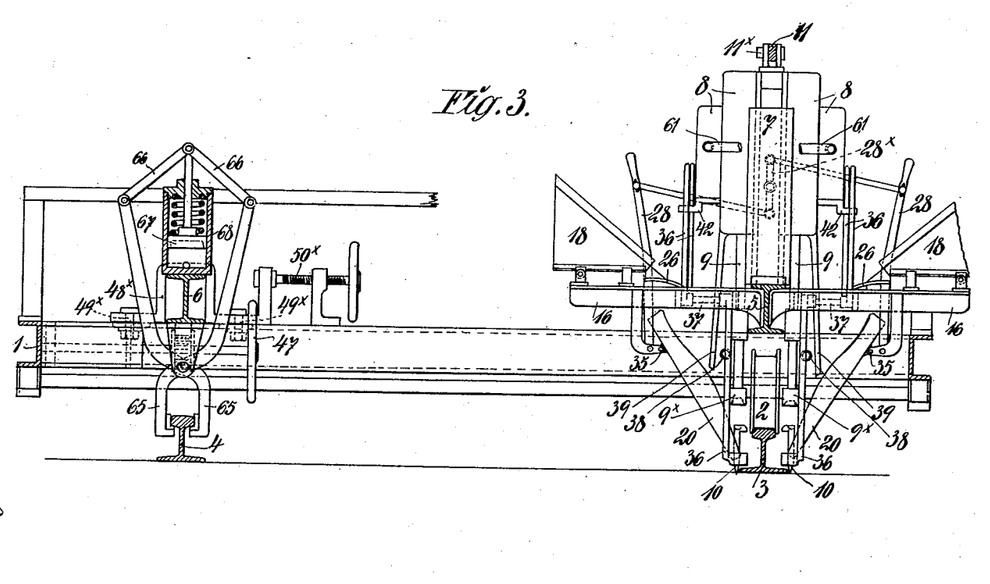
Fig. 3 is a section of the machine on the line A to B of Fig. 2.
Figures 4, 4A, 5, 6, 7:
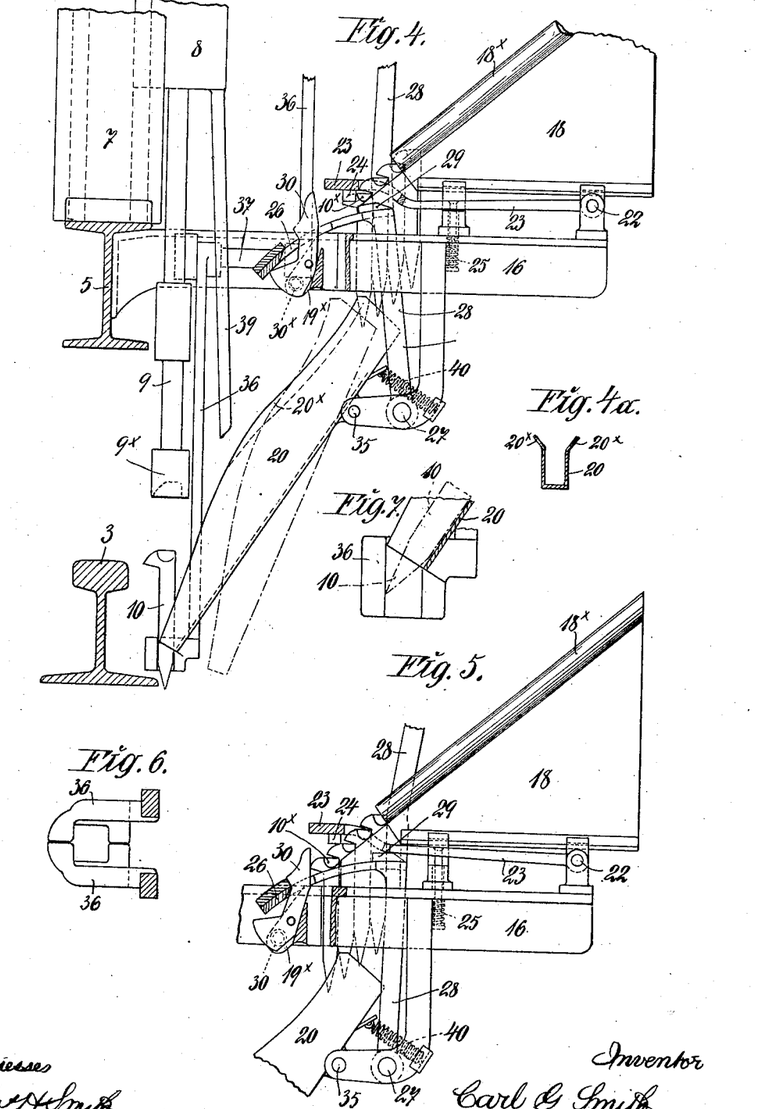

All the parts of the machine are mounted on a low truck, consisting of a frame 1 or the like, provided with subjacent shafts and running wheels 2, provided with flanges so that the truck can be moved on the two rails 3 and 4. Two horizontal beams 5, 6 are fixed in the frame 1 and located right above the rails 3 and 4 respectively, parallelly to the same. The spiking mechanisms are mounted on the said beams, two mechanisms for each rail, for forcing both the spikes on the respective side of the rail into the tie simultaneously. As the said mechanisms are constructed in the same manner, only one of the pairs, the right one, is shown in Fig. 3. An upright 7, which is mounted on the beam 6 and firmly connected with the same, forms the guide of two up and down moved, pneumatic hammer-devices, one on each side of the upright and provided with cylinder and piston. As the said hammers may be of any suitable construction, they are not described in detail. The cylinder or casing 8, in which the piston 9 is moved up and down, acted upon by any suitable driving medium such as compressed air, steam, or electricity, engages a groove in the upright or is in engagement with the same in any other suitable manner, so that the cylinder 8 and consequently the whole hammer-device can be moved up and down on the upright, guided by the same. The pistons 9, 9 are extended downward somewhat beyond the ordinary size and provided with a head 9ˣ, which is provided in its lower end with a cavity, adapted to the shape of the head of the spike, the whole being so arranged, that the center lines of both the pistons coincide exactly with the center lines of both the spikes 10, 10 respectively, which are to be forced into the tie, as shown in Figs. 3 and 4. The said cylinders 8, 8 are raised and lowered by means of a lever 11, extending longitudinally to the truck. The said lever is connected with both the connected cylinders by the slot and pin joint 11ˣ and is pivoted to the bracket 12, fixed on the beam 5. A counter-weight 13, movable on the lever 11, counterbalances both the hammer devices 8, 9, so that they can be moved easily. By moving the said hammers, which is effected manually by means of the lever 11, the advantage is gained, that the two hammers 8, 9 can be raised sufficiently for the locating of the spikes in their proper positions at the sides of the rail, under the hammer pistons 9, and that the necessary space can be provided for the said pistons to move up and down for effecting the blows, and, further, that the hammers can be lowered to the same extent, as the spikes are forced into the ties by the pistons, without altering the position of the piston 9 with relation to the cylinder 8, so that the spikes can be forced into the ties at their full length. Means are provided for admitting the driving medium and shutting off the same automatically and thus for starting the hammer-devices and stopping the same, as the said lever is shifted. The said means are described below.

The means for feeding the spikes automatically and guiding the same are arranged as follows: Arms, consisting of two side pieces 16, 16, extend from the sides of the beam 5 and support the parts, effecting the said operations. The arm 16 provided at the outer side of the beam 5 is supported at its outer end by the frame 1, and the arm 16 at the inner side of the beam 5 is supported by a stay (not shown in the drawings), connecting its end with the upright 7. The spikes are guided partly by the magazine 18, partly by a channel, the part 19 of which is stationary while its part 20 is movable, and finally by a pair of tongs. The said magazine 18 consists of a casing without bottom. The shape of the said casing in vertical section corresponds substantially to the shape of the spike, viewed from the side of the same, which is turned toward or from the rail, so that the top part 18ˣ of the casing is wider, containing the head of the spike provided with lugs, and its lower part is narrower, containing the narrow part or the shaft of the spike. The spikes are located one behind the other in a substantially vertical position and extend one above the other with their heads in such manner, that the head of a rear spike extends forward above the head of the spike located in front of the same. Consequently, the row of the spikes, viewed from the side is somewhat slanting, so that the spikes, acted upon by their own weight, can slide downward, in a direction oblique to the longitudinal direction of the spike, on the shelves, formed in the magazine by the enlargement of its top part and having a slanting position corresponding to the slanting position of the said row. The magazine is filled with spikes which are dropped one after the other in the same at its outer end, provided with a door. A pin 21 or the like inserted in the magazine, near its fore end, prevents the spikes from leaving the magazine at the said end, until the said pin is withdrawn.

The spike feeding mechanism comprises an arm 23, extending longitudinally to the arm 16 and pivoted to the same by means of a horizontal pin 22. At its free end, turned toward the hammer device, the said arm 23 has two lugs 24, 24 provided at its lower side and located at a suitable distance from each other, so that the spike can bear against the same with its lugs 10ˣ, mentioned above, and there may be room between the same for the projecting part of the head, which will engage the foot of the rail. The arm 23 is acted upon downward by a spring 25. Below the arm 23 another fork shaped arm 26 is provided, fixed to the lever 28, which is swingable on the horizontal pin 27. The said arm 26 is provided with lugs 29, 29, which, as the lever 28 is swung toward the right from the position shown in Fig. 4, will raise the suitably curved arm 23, to a higher position, Fig. 5. The said arm 26 coöperates with a stop for the spike, consisting of a short lever 30, extending upward through the arm 26, into the path of the spike. The said lever 30 is pivoted at 30ˣ to lugs 19ˣ projecting from the part 19 of the channel. The lower, broad end of the lever 30 rubs, during the movement of the lever, against springy side projections 30ˣ located in the lugs 19ˣ and bearing against the sides of the lever. Consequently, the lever 30 can resist a certain pressure, tending to swing the same, until the pressure overcomes the said friction resistance.

Figure 8:
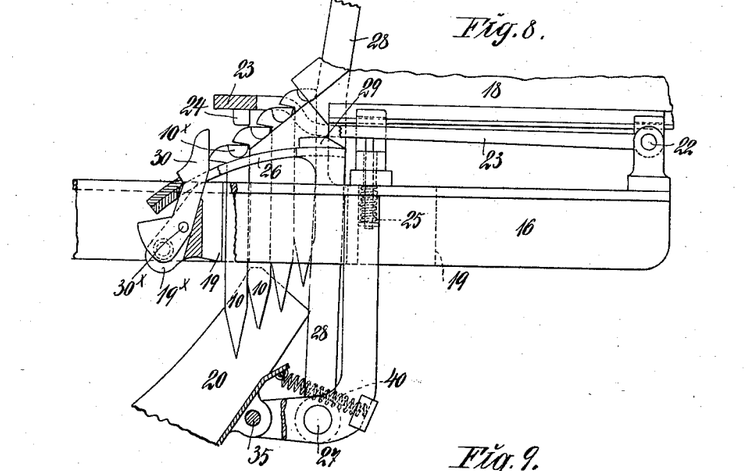
Fig. 8 is another side view and Fig. 9 is a plan view of the said feeding mechanism illustrating the operation of the feeding parts.
Figure 9:
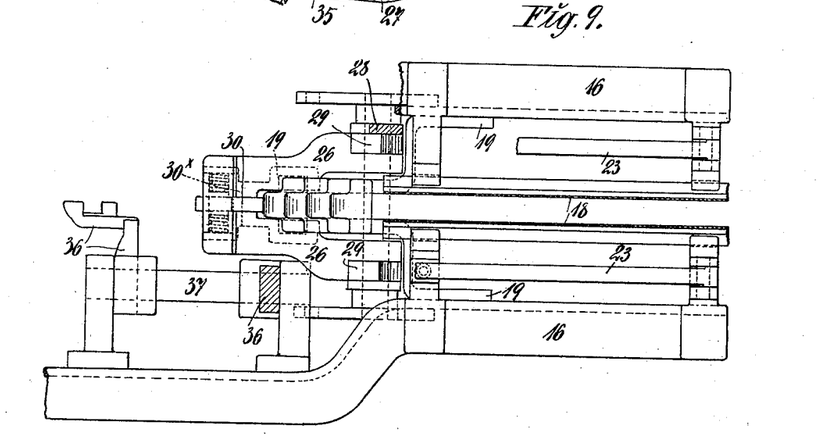
Figure 10:
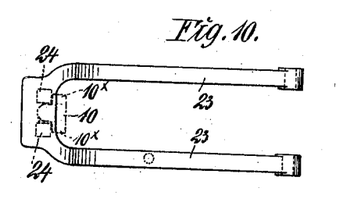
Figs. 10 and 11 are details of the feeding mechanism.
Figure 11:
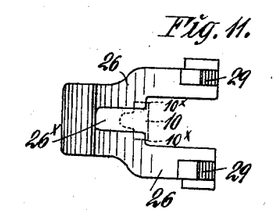

The positions of the lever 30 are fixed by the arm 26. As the arm 26 has been moved toward the right by means of the lever 28, it has acted upon the lever 30 by its closed end and moved the same to the position shown in Figs. 5 and 8. As the lever 28 is swung toward the left, the curve shaped arm 26 acts upon the lower end of the lever 30, projecting into its path, Figs. 5 and 8, so that the lever is moved to its other extreme position, Fig. 4. The arms 23, 26 are fork shaped, so that the magazine 18 can be located on the arm 16, into the spaces between the shanks of the arms. The magazine is provided at its lower side with lateral flanges, forming a foot piece for the same. The magazine, placed on the arm 16, is locked in its position by being pushed somewhat forward, so that the said flanges, provided with notches at suitable points, will be located under suitable projections on the arm 16, Fig. 18. The said holding means may evidently be modified. The slot 26ˣ, provided in the arm 26, is so narrow at the fore end of the arm, that the spike cannot pass through the same, but will hang on the arm by means of its lugs 10ˣ, Fig. 11. As the magazine is mounted into its position, the lever 28 has been swung toward the left and the arm 23 has been lowered. Owing to the friction between the lever 30 and the projections 30ˣ the said lever will remain in its right extreme position, Figs. 5 and 8, into which position it was moved by the lever 28 integral with the arm 26 when previously moved toward the right. As the pin 21 is withdrawn, the whole row of spikes slides forward in the magazine, so that the foremost spike will bear against the lugs 24, 24 by its lugs 10ˣ, Fig. 4. As the said spike is to be dropped, the lever 28 is swung toward the right. The arm 23 and thus the lugs 24 are thereby raised to such a level, that the foremost spike can advance beyond the said lugs 24, but before then the narrow part 26ˣ of the central slot of the arm 26 through the movement of the arm has been moved toward the right to such an extent, that the spike, which then is permitted to pass by the lugs 24, will hang on the arm 26 by its lugs 10ˣ, while the front side of the head bears against the stop, formed by the lever 30, which stop will remain in its position owing to the friction, as mentioned above. As the lever 28 is now swung toward the left, the arm 23 is lowered, so that its lugs 24 descend in front of the lugs 10ˣ of the next spike, and the wider part of the central slot of the arm 26 is then located under the foremost spike, so that the support for the said spike is withdrawn and the spike is able to fall down into the channel 19, 20, the top end of the stop 30 being then moved toward the left. During the movement last mentioned the pressure of the row of the spikes is transmitted from the stop 30 to the lowered lugs 24, so that the foremost spike is released from all side pressure and falls down into the said channel. In this manner the spikes can be dropped one after the other by swinging the lever 28. When the magazine has been emptied it is necessary only to substitute a magazine filled with spikes for the emptied one. In order that both the levers 28, 28 may be swung simultaneously as one of the same is actuated, the said levers are connected by links with respective end of a lever 28ˣ, pivoted to the upright 7, Fig. 3, the connection however being done in such a way, that it easily can be disconnected, when only one hammer is used as is the case, when a third spike in curves has to be driven down on the outside of the rail.

The channel 20 is inclined, and its lower part can be swung around the pin 35 by a projection 39 on the cylinder, so that its lower end can be moved out of the path of the piston 9. At the lower end of the channel a pair of tongs is located, adapted to receive and hold the spike in proper position during the first blows of the piston. A similar device is before known, but it must be observed, that in the present machine the pair of tongs forms a completion or supplement to the channel 20 and that the pair of tongs is withdrawn automatically from the piston, so that it must not be opened manually, in order that the piston may not strike the same during the last part of the driving in operation. The said tongs consist of two vertical levers 36, 36 located on each side of the path of the spike, passing to its position under the piston. The shafts 37, 37 of the said levers are journaled in bearings, mounted on the arm 16. The lower parts of the said levers are bent inward, toward the piston, Fig. 4, and then downward and U-shaped, so that the ends, located close to each other, form, below the end of the inclined channel 20, a short nozzle or funnel, square inside, Fig. 6, the inner surface of which, facing the channel, the spike, sliding down the inclined channel, strikes with its point, Fig. 7. The spike is thereby caused to occupy a vertical position and to slide on vertically, thus being brought into the proper position, close to the foot of the rail to be forced into the tie, Fig. 4. When sliding in the channel 20, the spike is supported by its lugs 10ˣ bearing upon the edges of the side walls of the channel, and the curve shape of the said side edges will assist in bringing the spike into its final vertical position. Fig. 6 is a section of the closed tongs on the line G to H of Fig. 4, and Fig. 7 shows, how the spike enters the tongs. The tongs are closed by the spring 38 located between the shanks and fixed to the same.

The means for moving the channel 20 out of the way of the piston 9, moved down with the cylinder, consist partly in the curved shape of the two high side walls 20ˣ of the channel 20, Fig. 4, partly of the projection 39, provided on the cylinder 8, and pointing downward toward the said side walls 20ˣ of the channel. The length of the said projection is so adapted, that, during the downward movement of the cylinder, the projection 39 strikes the channel, as the spike has been forced into the tie for about half its length, and causes the channel to swing on the pin 35 and get out of the way of the piston. As the cylinder is moved upward, a spring 40 returns the channel to its original position, shown in Fig. 4.

Figure 1:
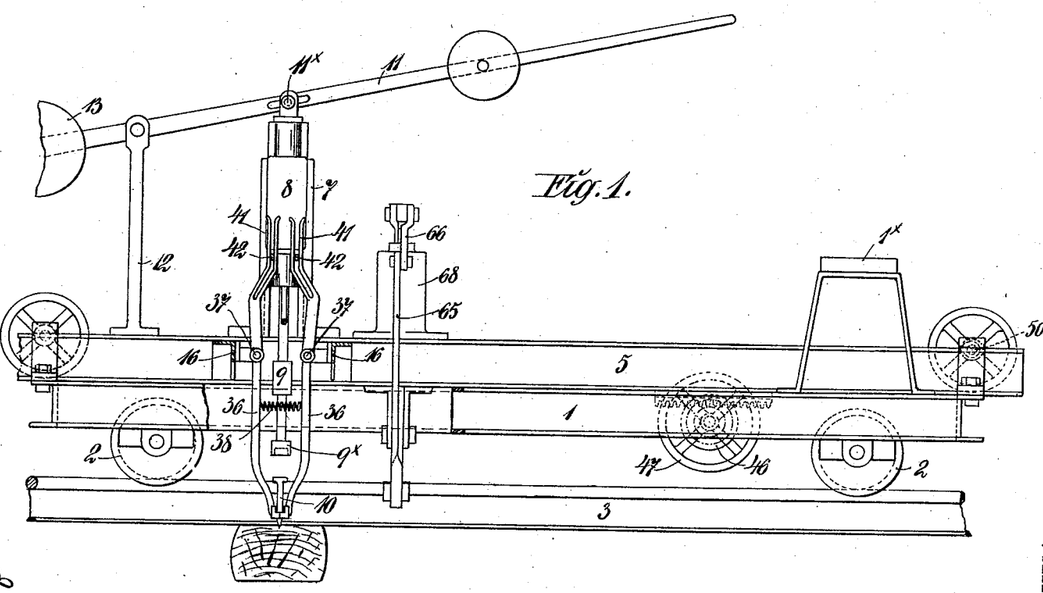
Figure 1 in the accompanying drawings is a side view, partly a sectional view of a machine arranged in accordance with this invention.
Figure 12:
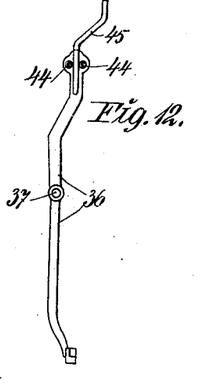
Fig. 12 shows one of the shanks of the tongs mentioned above.
Figure 13:
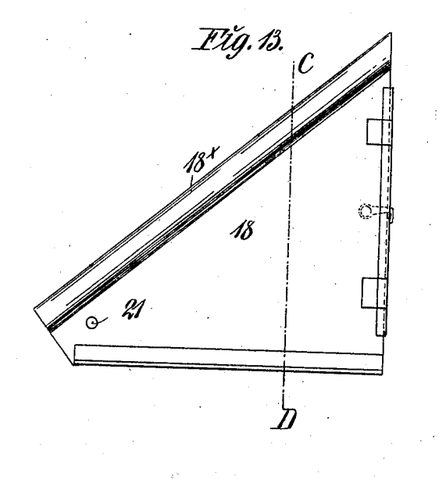
Fig. 13 is a side view of the spike magazine.
Figure 14:
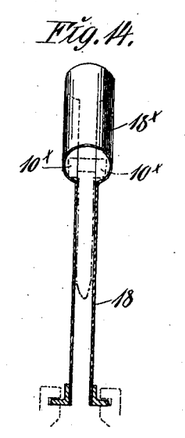

The means for moving the jaws of the tongs out of the path of the descending piston consists, Fig. 1, partly in the fork shape of the top ends 41 of the levers 36, partly of projections 42 on the cylinder, which projections, as the cylinder is lowered, pass downward in the said forks and, in consequence of the bent shape of the forks, finally open the tongs for the piston 9. The said means may be modified in such manner that each of the shanks of the tongs is provided with two rollers 44, Fig. 12, and the cylinder with projections 45, the position of which is so adapted, that they can enter into the space between the rollers 44, and so shaped, that they open the tongs, as the cylinder is lowered.

The means for starting automatically the two hammers and stopping the same, as the lever 11 is moved as stated above, are arranged as follows, Figs. 15 to 17 inclusively. A vertically sliding rod 51 is rotatably mounted on the upright 7 and acted upon by a spring $51^{xx}$, forming a resistance to the rotary movement of the said rod. The rod 51 is provided with a cam $51^x$, extending longitudinally to the rod and suitably curve shaped, so that the rod is rotated, as any part passes the cam vertically. Such a part is the horizontal arm 52, shown in the drawings, which arm is fixed to the hammer cylinder 8 and provided with a joint, so that the outer part of the arm can be swung in one direction, while a spring 53 tends to return the same into its original position. At its lower end the rod 51 bears with a suitable projection 54 against the slanting top side $55^x$ of a piece 55, which is connected with the upright in a sliding manner and can be moved up and down. The said piece is held in its upper position by a spring 56. Below the piece 55 a valve 57 is provided, by which the compressed air or the driving medium is admitted or shut off. The said valve communicates with an air compressor through the hose 58. The compressed air passes by the valve body 59, when forced down, and then through a hose 60 to one of the hammer cylinders and through a hose 61 to the other hammer cylinder. The piece 55 when forced downward opens the valve 59 by acting upon the upward extending rod of the same. As the lever 11 is forced downward, the arm 52 rotates the rod 51 by acting against the cam $51^x$, which results in a movement downward of the piece 55 and the valve 59 owing to the slanting surface $55^x$. The valve 59 is now held in its open position, while the arm 52 passes by the extended cam $51^x$, but, as the spike has been forced into the tie, the arm 52 has passed by the cam $51^x$, and consequently the valve is closed by the spring $59^x$. The piston 9 is then stopped. As the lever 11 is then moved upward, the arm 52 ascends at the opposite side of the cam $51^x$, owing to the fact that the latter has changed position acted upon by the spring $51^{xx}$, rotating rod 51 in the opposite direction, and that the arm 52 can bend at its joint. As the arm 52 has passed by the cam $51^x$, it resumes its original shape and is able again to rotate the rod 51.

For moving the machine on the track an electric motor and a suitable gearing may be provided, not shown in the drawings.

Figures 15, 16, 17, 18:
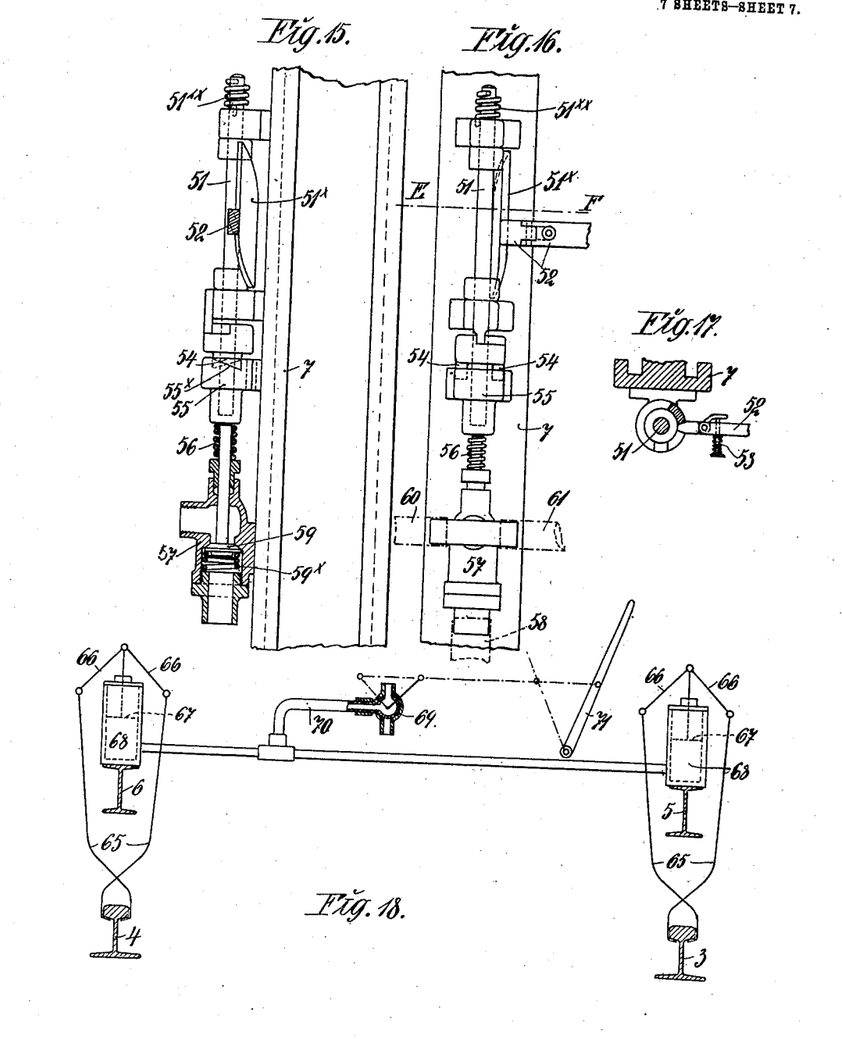
Figs. 15 and 16 show a mechanism, viewed from different sides, for admitting the driving medium and cutting off the same automatically.
Fig. 17 is a section on the line E to F of Fig. 16.
Fig. 18 shows schematically means for holding the trolley to the rails.

In order to hold the machine to the rails two tongs 65, Fig. 18, are provided on the truck and adapted to embrace the rails. The upward extending shanks of each pair of tongs are connected by links 66 with the rod 67 of a piston acting in a cylinder 68, communicating through a branch with the hose for the compressed air. Fig. 18 shows the parts schematically. A three way cock 69 connects the hose with a pipe 70, which through branches communicates with the cylinder 68. The said cock is controlled by means of a lever 71. As the said lever is swung in one direction, compressed air enters the cylinders 68, and as the lever is swung in the opposite direction the compressed air is shut off and the cylinders connected with the atmospheric air.

The mode of operating the machine is easily understood from the above description.

Two operators, one for each of the rails, take seats on the bench $1^x$ of the machine and manage each of the two levers 11. A third man or a boy attends to the changing of the magazines and their filling with spikes. After spikes have been dropped into the two channels, the lever 11 is swung down slowly. The driving medium is thereby admitted automatically and the pistons, accompanying the descending cylinders, are moved up and down, striking the spikes and forcing the same into the ties. The channel parts 20 get out of the way of the pistons and the tongs are opened for the same automatically and at the proper moments. It has been, already by the first trials proved with a machine practically used that the whole operation from the dropping of the spikes into the tongs and the forcing of the same into the ties inclusively requires only six seconds on an average.

Figure 2:
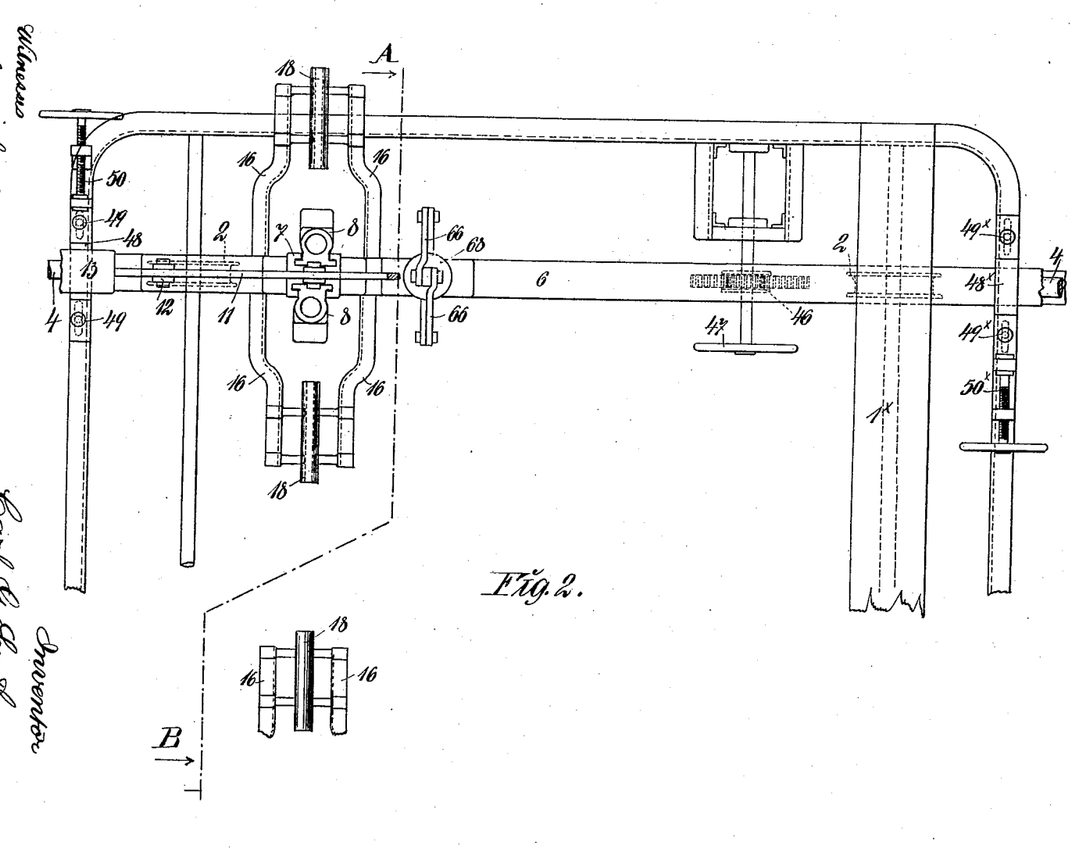
Fig. 2 is a plan view of the half part of the machine. The said figures show the machine only schematically.

In order that always the four spikes may be forced into the tie simultaneously even if the tie should have a somewhat oblique position i. e. should not be placed at right angles to the road-bed, one of the beams 5 and 6, the beam 6 in the drawings, (Fig. 2) is movable longitudinally to the frame 1 and provided with teeth meshing with a pinion 46, sliding on its shaft and rotated by means of a hand-wheel 47 fixed on the said shaft. Owing to the said arrangements the two pairs of hammer devices can easily be adjusted mutually and with relation to the position of the tie. At the beam, movable in the said manner, the outer arm 16 is slidable longitudinally to the frame 1. As the gage of the track also changes somewhat, being somewhat greater at the curves than at the straight parts, the beam 6 is movable also transversely to the frame 1. This may be effected in many ways. According to the drawings (Fig. 2) the said beam is slidable also transversely on the frame 1 and fork shaped pieces 48, 48 connecting the same with the frame 1, are movable longitudinally to the frame piece by means of screws 49, 49ˣ and slots, provided for the same, and combined with suitable set screws 50, 50ˣ, by means of which the said adjusting can be effected. Generally only the fore screw is used for the adjustment. The running wheels at one side of the machine are movable longitudinally to the shafts, so that the distances between the wheels can change in accordance with the gage of the track.

The described machine may be used also for other purposes than the described one and may also be stationary.

Having now described my invention, what I claim as new and desire to secure by Letters Patent is:

1. In a machine for forcing the spikes into the ties in the constructing or repairing of railways, and for other purposes, the combination of hammer devices, which can be raised and lowered in a suitable frame in such manner, that the cylinder of the hammer piston, in which acts the medium actuating the said piston, partakes in the movement up and down, guiding means for the said devices, means for effecting the said raising and lowering operations, means for feeding the spikes, and guiding means for the fed spikes, which means, owing to the descending of the cylinder, are moved automatically out of the way of the pistons, as the spikes have been forced into the tie partially.

2. In a machine for forcing the spikes into the ties in track-laying the combination of a suitable portable frame, hammer devices, provided in the same, cylinders in which the driving medium acts and which can be raised and lowered and which guide the pistons of the said hammer devices, vertical guides for the said cylinders, a lever for effecting the said raising and lowering operation manually and means for feeding and guiding the spikes.

3. In a machine for forcing the spikes into the ties in track-laying the combination of hammer devices provided in pairs in a suitable portable frame, cylinders, which can be raised and lowered and in which the driving medium acts upon the pistons of the said devices, guiding means for the said pair of devices, a lever for raising and lowering the said pair of devices, and means for feeding and guiding the spikes.

4. In a machine for forcing the spikes into the ties in track-laying the combination of a hammer device for forcing the spikes into the ties, which device can be raised and lowered, means for effecting the said raising and lowering operation, a removable magazine for the spikes, which is located near the hammer device and at its top has a wider part for the heads of the spikes, the spikes being located in the said magazine one behind the other in such manner, that a rear one projects with its head over the head of the preceding one and that the whole row of spikes can be advanced by its own weight, obliquely to the longitudinal direction of the spike, and means for admitting the spikes one by one from the said magazine to a channel, guiding the same to the foot of the rail.

5. In a machine for forcing the spikes into the ties in track-laying the combination of hammer devices for forcing the spikes into the ties, which devices can be raised and lowered, a removable magazine for the spikes, in which the spikes are located one behind the other and can slide downward owing to their own weight and the slanting position of shelves, on which the spikes hang on their lugs, a channel guiding the spike to the foot of the rail, and a mechanism located between the said magazine and the channel and adapted to admit the spikes one by one, the said mechanism comprising an upper horizontal arm (23), which can be raised and lowered and on its lower side is provided with projections (24), extending downward in front of the lugs of the foremost spike, and a lower arm (26) movable in the feeding direction of the spike and determining by its position the vertical position of the upper arm, the said arm (26) being provided with an opening so shaped, that it does not permit the spike to drop through the same, when the arm (26) is moved to a rear position and the arm (23) is raised, but permits the spike to drop, when the arm (26) is moved forward and the arm (23) is lowered, in which case the projections of the arm (23) form abutments for the next succeeding spike.

6. In a machine for forcing the spikes into the ties in track-laying the combination of hammer devices for forcing the spikes into the ties, which devices can be raised and lowered in a suitable frame, magazines for the spikes, two movable arms located in the path of the spike one behind the other, which alternately form an obstacle to the spike fed forward, and an adjustable abutment for the spike, which abutment, after the first obstacle has been moved into operating position and as the second obstacle is moved into inactive position, is finally removed by the part forming the obstacle last mentioned, so that the admitted spike is released from every lateral pressure and can fall down into a subjacent channel.

7. In a machine for forcing the spikes into the ties in track-laying the combination of hammer devices for forcing the spikes into the ties, which devices can be raised and lowered in a suitable frame, a removable magazine for the spikes provided near to each hammer device, a stopping device, provided on a lever and in the path of the spike, for admitting the spikes one by one, and another stopping device for the same purpose, which is actuated by the stopping device first mentioned and is caused to operate alternately with the same.

8. In a machine for driving spikes into ties in laying railway tracks, the combination of hammer-devices, a frame on which said devices are supported and adapted to be raised and lowered, an inclined channel near to each hammer-device which channel guides the spikes to the foot of the rail, a pair of tongs receiving the spikes from the channel, said channel being pivotally mounted so that it can be moved out of the way of the piston of the hammer, and a device by means of which the said movement is effected owing to the lowering of the hammer-devices.

9. In a machine for forcing the spikes into the ties in track-laying the combination of hammer-devices, which can be raised and lowered in a suitable frame, a mechanism near to each hammer-device for feeding the spikes from a magazine to the foot of the rail, a pair of tongs receiving the spike fed from the magazine and bringing the same into the proper position and holding it into the said position, while forced into the tie, the said tongs being opened by the lowered hammer-device, acting on the shanks of the tongs, as the spike is partially forced into the tie, so that room is made for the piston of the hammer, while forcing the spike completely into the tie.

10. In a machine for forcing the spikes into the ties in track-laying the combination of hammer-devices which can be raised and lowered in a suitable frame and are adapted to be driven by compressed air, steam or the like and so arranged that the cylinder, in which the driving medium acts, can be moved up and down, a valve admitting the driving medium and shutting off the same, means for opening and closing the said valve automatically through the hammer-device when moved downward, so that the piston of the hammer-device is stopped automatically in its movement up and down, when the spike has been forced into the tie, and a mechanism for feeding and guiding the spikes and holding the same, while they are forced into the tie.

11. In a machine for forcing the spikes into the ties in track-laying the combination of hammer-devices which can be raised and lowered in a suitable frame and are driven by compressed air, steam or the like, a valve for admitting the driving medium and shutting off the same, a rotatable rod, acting upon the said valve by means of a movable interposed piece provided with an oblique surface, a lateral cam piece on the said rod for effecting the said rotary movement, which cam piece is acted upon by the hammer devices and is released from the same automatically, when moved downward, so that the hammer-devices are brought into operation and stopped automatically, means for raising and lowering the hammer-devices, and means for feeding the spikes, guiding and holding the same.

12. In a machine for forcing the spikes into the ties in track-laying the combination of hammer-devices for each rail, which devices can be raised and lowered in a suitable frame, a beam located in the frame longitudinally to the rails and supporting the said hammer-devices, which beam is adjustable longitudinally as well as transversely, means for effecting the said adjustments, means for raising and lowering the hammer-devices, and means for feeding the spikes and guiding the same.

13. In a machine for forcing the spikes into the ties in track-laying the combination of hammer-devices, which can be raised and lowered in a suitable frame, movable on the track, and are adapted to be driven by compressed air or steam, means for raising and lowering the said hammer-devices, means for feeding the spikes and guiding the same into a position below the piston of the hammer-device, means for holding the spikes in the said position, clamping devices for holding the said frame to the rails, while the spikes are driven into the tie, and pistons forcing the said clamping devices into operating position and acted upon by the said driving medium, acting in cylinders adapted for the purpose.

In witness whereof, I have hereunto signed my name in the presence of two subscribing witnesses.

CARL GUSTAF SMITH.

Witnesses:
A. SÖDERSTRÖM,
ROBERT APELGREN.